Sept. 15, 1959       R. M. SMITH       2,903,974
MOTIVE POWER UNITS FOR MODEL RAILROADS
Filed June 25, 1956
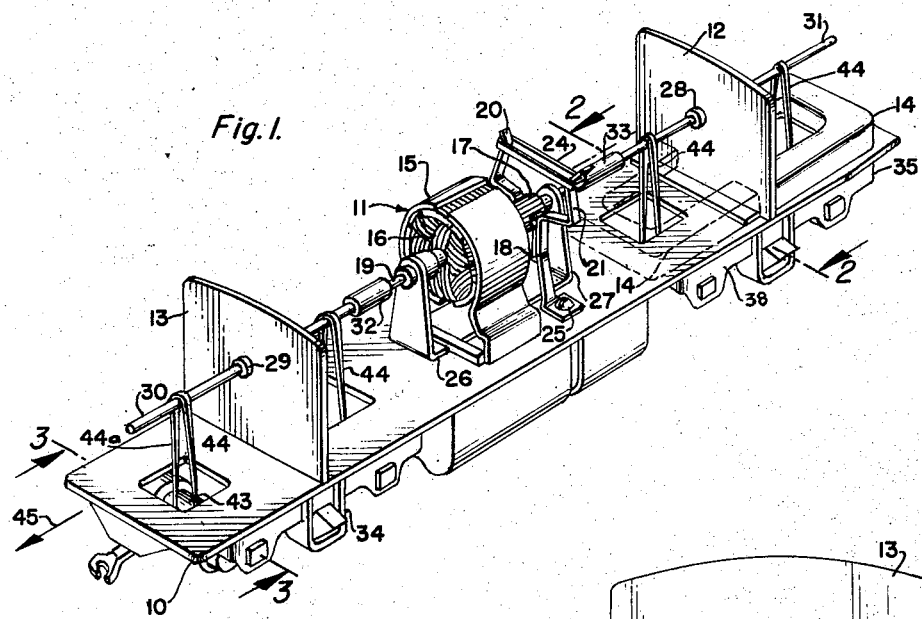
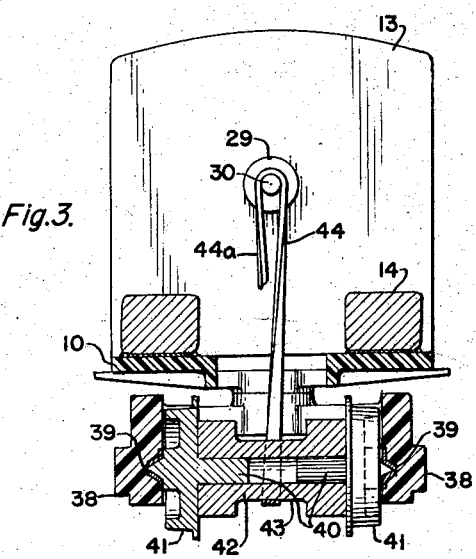
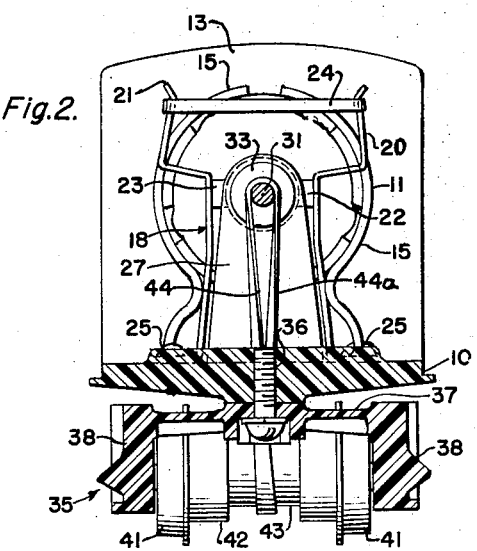
ROBERT M. SMITH,
INVENTOR.
BY *W. Glenn Jones*
ATTORNEY.

United States Patent Office 2,903,974
Patented Sept. 15, 1959

2,903,974

MOTIVE POWER UNITS FOR MODEL RAILROADS

Robert M. Smith, Santa Monica, Calif.

Application June 25, 1956, Serial No. 593,766

6 Claims. (Cl. 105—101)

This invention relates to a motive power unit for model railroads and particularly to a simple and inexpensive form of power transmission for model railroad motive power units.

Similar power units in the prior art consist of one or more electric motors mounted on the basic body frame and connected to the trucks by more or less complicated arrangements of gears, flexible shafts, and universal joints. Other forms of motive power consist of smaller sized electric motors mounted on the individual power trucks, still with their more or less complicated forms of gearing use for the motive power transmission between the electric motor and the driving axles. Such forms of transmission have been found to be comparatively expensive, even when the worms are molded in one piece, as in the patent to Varney, No. 2,739,541, of cheap and relatively non-durable material; are subject to excessive friction; and, chiefly due to the irreversibility of the worm and worm gear combination, extremely unsatisfactory in starting and stopping characteristics. Such motive power units start up with a rush and then stop suddenly with the wheels and driving axles locked in place. It is, of course, obvious that such unsatisfactory performance is extremely unrealistic and not to be compared with the smooth and powerful starting and stopping found in modern full scale practice.

A principal object of my invention, therefore, is to provide a simple, inexpensive, and yet extremely reliable power transmission for model railroad motive power units.

Another object of my invention is to provide such a power transmission system which transmits power to to each driving axle without any cumbersome and inefficient form of mechanical gearing.

A still further object of my invention is to provide a power transmission that is capable of effecting smooth starting and stopping of the motive power unit.

A still further object of my invention is to provide a power transmission that is capable of adjusting itself automatically to meet any reasonable power requirement.

Yet another object of my invention is to provide a power transmission for model railroad motive power units that is easily disassembled for repair and replacement of parts and will furnish maximum protection to the prime mover.

Various other objects of the invention will be apparent from the following description taken in conjunction with the accompanying drawings wherein:

Figure 1 is a perspective view of the basic framework of a model railroad motive power unit illustrating my invention;

Figure 2 is a cross-section of the motive power unit taken at the line 2—2 of Fig. 1; and Figure 3 is a cross-section of the motive power unit taken at the line 3—3 of Fig. 1.

Referring to the accompanying drawings, wherein similar reference characters designate similar parts throughout, and with particular reference to Fig. 1, the numeral 10 indicates the main frame of the motive power unit. It is to be understood that any desired appropriate superstructure (not shown) may be placed on said frame so as to simulate any particular prototype, such as the big passenger or freight diesel engines or perhaps a model of a diesel switcher.

The main frame 10 supports an electric motor 11, bearing supports 12 and 13, and weights 14. The electric motor 11 is supplied with the usual motor frame 15, field coils and armature 16, commutator 17, brush rigging 18, and through armature shaft 19. Brush rigging 18 comprises spring brush supports 20 and 21, brushes 22 and 23, and flexible band 24. The spring brush supports 20 and 21 may be screwed to the main frame 10 by screws 25, as shown, or may be otherwise screwed to a motor sub-base, not shown. The combination of the spring brush supports and the flexible band 24 provides a simple but effective arrangement for insuring the proper brush pressures on commutator 17. The strength or size of flexible band 24, which in its simplest form may be a common rubber band, may be easily chosen to give a brush pressure which, while not resulting in excessive friction, will be sufficient to prevent undue sparking. The armature shaft 19 is supported in the usual manner by base supports 26 and 27.

Bearing supports 12 and 13 carry bearing inserts 28 and 29 which may be of bronze, brass, or other anti-friction materials. Shafts 30 and 31 are rotatably supported in these bearing inserts and are connected to the armature shaft 19 by connectors 32 and 33. These connectors may be made of any suitable material but are preferably made of some form of flexible tubing which is forced over the ends of the shafts and, being flexible, allows for any slight shaft misalignment that may be present.

Main frame 10 supports a pair of two-axled trucks 34 and 35. These trucks are centrally attached to the main frame by a single screw 36 as is customary in such construction and are free to swing about the screw 36 so as to follow the track curvature and yet will not be separated from the main frame when the motive power unit is removed from the rails.

Each truck consists of a cross-bolster 37 and truck sides 38. The truck sides are formed so as to simulate various prototype motive power trucks. Customarily, these bolsters and truck sides are held together by a single screw in each side or some other form of flexible attachment whereby the truck sides are able to move relatively to each other so as to provide a limited form of equalization. Such construction features are well known. Where such trucks are formed of plastic, cone shaped metallic inserts 39 may be provided to receive the corresponding cone shaped ends of metallic axles 40, thus reducing friction and undue wear.

Stub axles 40 and wheels 41 may be made in one piece, usually of metal for wear reducing purposes and for electric current pick-up from the conducting metal rails on which such units are operated. Some wheels, however, may be made of specially compounded durable plastics and pressed on the stub axles 40. Stub axles 40 are pressed into a main connecting axle 42 which is preferably formed of a durable plastic or other non-conducting medium. These main axles are formed as shown with a central portion 43 of reduced diameter or may otherwise be provided with a V-shaped groove (not shown).

Flexible bands 44 are provided to serve as power transmitters between the shafts 30 and 31 and for the four main connecting axles 42. These flexible bands are made of an elastic, durable material such as neoprene, rubber, or other like substance. They are chosen of such length with relation to the shaft and axle size and shaft and axle center distances so that when shaft contact is made directly above the center of the corresponding main axle, the band will be under a slight tension. Such tension should not be great enough, however, as to cause any deflection of the shafts 30 and 31, about their point of support 29 in the bearing supports 12 and 13. Such deflection, of course, would cause binding or increased friction at these points of support and, due to an increase in misalignment, would cause further binding at the connection with the armature shaft 19.

The simple but unique and effective mode of operation may now be explained. For purposes of this explanation and with reference to Fig. 1 consider the forward direction of motion to the left as shown by arrow 45 and focus attention on the left hand flexible band 44 with its shaft 30. As electric current of proper polarity is applied to the rails and the electric motor 11 in the customary manner, shafts 19, 30, and 31 commence to revolve in a counter-clockwise direction.

However, flexible band 44 remains stationary until the heat being developed at the point of contact of the band and the shaft increases the inherent adhesive qualities of the band. It then starts to rotate slowly with the shaft still spinning within its contact bight. At this point, the leading portion 44a of the band is beginning to travel downwardly causing main axle 42 to turn in the direction for forward motion of the power unit. Due to the difference in sizes between the shaft 30 and the main axle 42, a speed reduction is effected which may be of any desired ratio within practicable limits. While initially there will be slippage at both points of contact of the band 44 with shaft 30 and main axle 42, it should be obvious that the greatest slippage will be at the shaft contact.

As the band 44 commences to turn with the shaft 30, it travels to the left due to the twist in the band caused by the fact that main axle 42 is suspended at right angles or transversely to the longitudinal shaft 30. As the band travels to the left on shaft 30, it increases in length and thus in tension which, in turn, increases the adhesion between band and shaft until, finally the band is rotating at the same speed as the shaft. When this condition is reached, i.e. when all relative movement between band and shaft has ceased, the band ceases to travel on the shaft, and the unit is proceeding at full speed.

It should be obvious, now, that as the load is increased, such as by adding more weights on the power unit or adding more cars, the required tension of the band will be greater, it will travel further along the shaft, and the time period for acceleration to the full speed condition will be increased. If the load is unreasonably increased, the band will simply continue to slip on shaft 30 or on main axle 42 and motor 11 will not be stalled which, in turn, protects it from burning out due to the usual excess current accompanying the stall condition.

While the foregoing explanation has been addressed to but one band 44 with its corresponding shaft and main axle, it should be understood that all the bands will act in the same manner. Furthermore, all of the bands will assume an equal share of the load regardless of whether or not their initial tensions were equal. This condition results from the fact that the final tensions will be equalized which in turn will result from the bands traveling along unequal portions of the shaft, or in other words, assuming different lengths so that their final tensions become equalized.

Another phenomena that should be observed is that this form of transmission gives a smooth transition from the lowest speed the motor is capable of to the highest speed. As is well known, the speed control for such motors is erratic and is not continuously variable. Say the condition of equilibrium, as previously described, is reached with half voltage on the rails. Then full voltage is applied. A certain degree of slippage between band and shaft immediately occurs and there now being relative motion between band and shaft, the band starts to travel to the left again, increases tension until the band again is turning at the same rate of rotation now possessed by the shaft. The momentum of the already moving power unit and its load assists in this smooth transition from half to full power or speed.

When power is cut off, there is no immediate locking of gears. The motor shafts slow down, and the bands, now rotating faster than the shafts, commence to travel in the opposite direction until they reach their initial position or even travel slightly in the reverse direction. Under normal conditions, the train or power unit under the influence of its previously attained momentum and the slight flywheel effect of the armature will coast naturally to a stop. Under some circumstances, the power could be applied to the motor in reverse, which would afford a smooth braking action where it was desired to stop the first motion of the train at a particular location.

While the foregoing explanation has been addressed to the forward motion of the unit, it should be understood that a like result would occur, in reverse, when it was desired to move the unit in the backward or opposite direction.

To replace one or more of the bands, it is merely necessary to disconnect shafts 30 and 31 from armature shaft 19 by removing one or both of the connectors. The shaft 30, or 31, may then be pulled through its bearing, and removed from the assembly. One of the truck sides may then be removed which will drop the axles and wheels. The worn band can then be removed and a new one placed in its stead. Reassembly would be accomplished by following the above steps in reverse.

While I have shown and described my invention in one preferred embodiment, it should be understood that the construction may be varied within comparatively wide limits without departing from the spirit of the invention as set forth in the accompanying claims. For instance, while two two-axled trucks have been used for purposes of illustration, any number of trucks with any required number of axles could well be used. A further variation would be the substitution of a small gasoline engine for the electric motor shown.

Having thus described and shown my invention, I claim:

1. In a motive power unit for model railroads, in combination: a main frame having a longitudinal axis in the direction of motion of said motive power unit and a horizontal transverse axis substantially normal to said longitudinal axis; a prime mover supported by said frame; a longitudinal drive shaft of constant diameter rotatably supported on said frame and driven by said prime mover, said drive shaft being disposed substantially parallel to said longitudinal axis; a plurality of wheeled axles supporting said frame in spatial relationship above the tracks of said model railroad; said wheeled axles being disposed substantially parallel to said transverse axis; and elastic friction band drive means for transmitting power from said longitudinal drive shaft to each of said wheeled axles, said friction band drive means comprising a plurality of flexible endless bands depending substantially vertically from said drive shaft, each of said bands embracing a contact portion of said drive shaft and a central portion of the wheeled axle substantially vertically underneath said contact portion of said drive shaft.

2. A motive power unit for model railroads as claimed in claim 1 further characterized by each of said flexible endless bands being adapted to travel longitudinally of said drive shaft away from the said wheeled axle with which each of said bands is connected when said drive shaft is rotated by said prime mover.

3. In a motive power unit for model railroads, in combination: a frame; a prime mover supported by said frame; a constant diameter longitudinal power drive shaft rotatably supported on said frame; said power shaft extending generally in the direction of motion of said motive power unit and driven by said prime mover; a plurality of rotatable wheeled axles disposed underneath said frame and supporting said frame, said axles being further disposed substantially normal to the vertical plane passing through said longitudinal power drive shaft; and a plurality of elastic, quarter-turn, adhesive band drive means stretching between said power drive shaft and the central portions of said wheeled axles, each of said drive means comprising an endless band looped at the upper end over a contact portion of said drive shaft, depending substantially vertically from said drive shaft, and looped at the other lower end around a central portion of one of said axles whereby power is frictionally transmitted from said power shaft to the said axle disposed substantially vertically beneath said contact portion of said drive shaft.

4. A motive power unit for model railroads as claimed in claim 3 wherein said elastic endless bands are adapted to reciprocate longitudinally of said power drive shaft due to the quarter-turn, adhesiveness, and frictional contact between said bands and said power drive shaft when said power drive shaft is rotated by said prime mover.

5. A motive power unit for model railroads, comprising in combination: a main frame; a prime mover supported by said frame substantially centrally thereof; transverse bearing suports carried by said main frame and disposed on opposite sides of said prime mover; longitudinal constant diameter power drive shafts rotatably supported by said bearing supports and driven by said prime mover; a plurality of trucks pivoted to the lower side of said main frame; a plurality of wheeled axles supported by said trucks substantially transversely of said main frame and said longitudinal power drive shafts; and a plurality of power transmission means between said power shafts and said wheeled axles wherein each of said power transmission means consists of an endless, elastic, quarter-turn band embracing a contact portion of one of said drive shafts, depending substantially vertically from said contact portion, and embracing a central portion of one of said wheeled axles, said one of said axles being disposed substantially vertically beneath said contact portion whereby power is frictionally transmitted from said power drive shafts to each of said wheeled axles.

6. In a motive power unit for model railroads, in combination: a frame; a prime mover supported by said frame; a constant diameter longitudinal power shaft rotatably supported and driven by said prime mover, said power shaft extending generally in the direction of motion of said motive power unit; a plurality of rotatable wheeled axles disposed underneath and supporting said frame, said wheeled axles being disposed substantially transversely to said direction of motion; and a plurality of elastic, quarter-turn band drive means stretching between said power drive shaft and the central portions of said wheeled axles, each of said band drive means comprising an endless band looped at the upper end over a contact portion of said drive shaft, said endless band depending substantially vertically from said drive shaft, and looped at the other lower end around a central portion of one of said axles, said band being turned a quarter-turn with the vertical plane of the upper looped end thereof disposed angularly with respect to the vertical plane of the lower looped end whereby power is frictionally transmitted from said power shaft to the said wheeled axle disposed substantially vertically beneath said contact portion of said drive shaft and said quarter-turn band is adapted to reciprocate longitudinally on said power shaft when said shaft is rotated by said prime mover.

References Cited in the file of this patent

UNITED STATES PATENTS

| | | |
|---|---|---|
| 63,266 | Miller | Mar. 26, 1867 |
| 379,786 | Hunt | Mar. 20, 1888 |
| 393,572 | Paget | Nov. 27, 1888 |
| 430,147 | Pfingst | June 17, 1890 |
| 691,358 | Creveling | Jan. 21, 1902 |
| 946,855 | Harp | Jan. 18, 1910 |
| 1,230,625 | Thayer | June 19, 1917 |
| 1,411,363 | Lieberman | Apr. 4, 1922 |
| 1,628,185 | Peters | May 10, 1927 |
| 1,867,678 | Rayburn | July 19, 1932 |
| 2,616,115 | Dayton | Nov. 4, 1952 |